United States Patent
Yamamoto et al.

(10) Patent No.: US 6,356,522 B1
(45) Date of Patent: Mar. 12, 2002

(54) OPTICAL DISK DRIVE

(75) Inventors: Takeharu Yamamoto, Osaka; Katsuya Watanabe; Mitsuro Moriya, both of Nara; Hiromichi Ishibashi, Osaka; Takashi Kishimoto, Nara, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/406,796

(22) Filed: Sep. 28, 1999

(30) Foreign Application Priority Data

Sep. 30, 1998 (JP) .......................................... 10-277195

(51) Int. Cl.[7] ................................................ G11B 7/00

(52) U.S. Cl. ............................... 369/47.28; 369/47.48; 369/44.13

(58) Field of Search ........................... 369/44.13, 47.23, 369/47.28, 47.48, 32

(56) References Cited

U.S. PATENT DOCUMENTS 4,959,823 A * 9/1990 Getreuer et al. ......... 369/44.13

* cited by examiner

Primary Examiner—Nabil Hindi
(74) Attorney, Agent, or Firm—Eric J. Robinson; Nixon Peabody LLP

(57) ABSTRACT

In performing CLV readout, a target frequency is corrected based on current and target numbers of revolutions of a disk motor during a seek operation, thereby controlling the frequency of a read clock signal at a value approximately equal to the corrected target frequency. In performing CAV readout on the other hand, the frequency of the read clock signal is approximately equalized with a data read frequency at a seek destination. By performing these frequency control operations, data reading can be started quickly enough after the seek operation is finished. In reading out information from a recordable disk with wobbling tracks on a data portion, frequency control is performed using a wobble signal with respect to an unrecorded data portion, and phase locking control is performed using a data signal with respect to an address portion. In this manner, an address can be read out constantly.

10 Claims, 14 Drawing Sheets

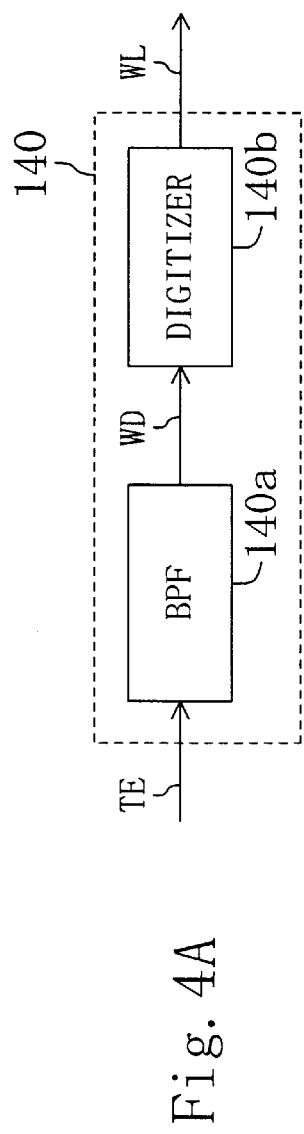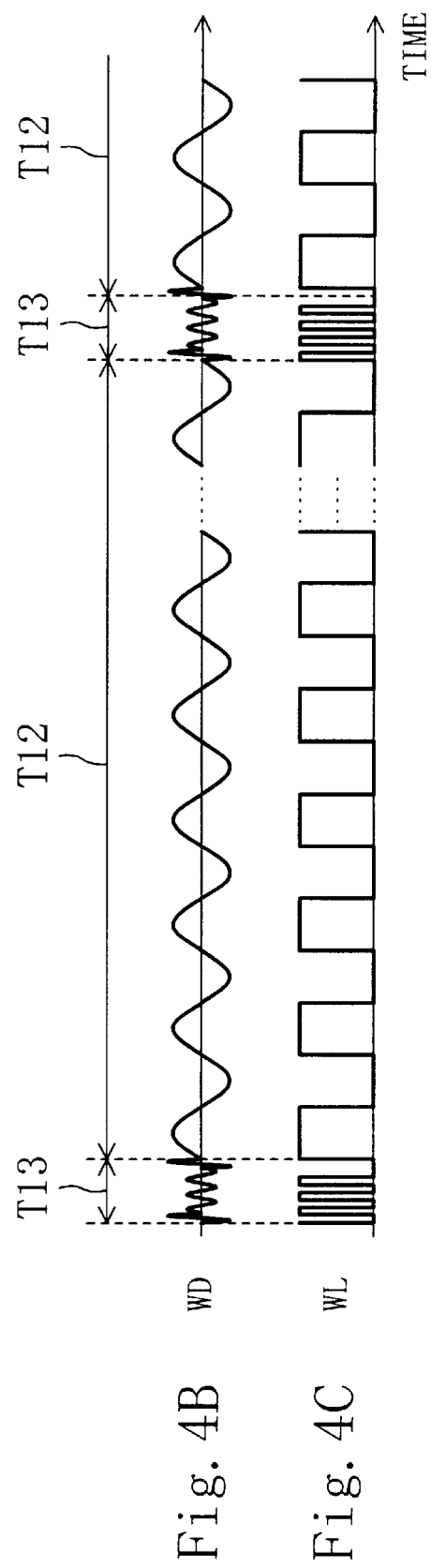
Fig. 4A
Fig. 4B
Fig. 4C

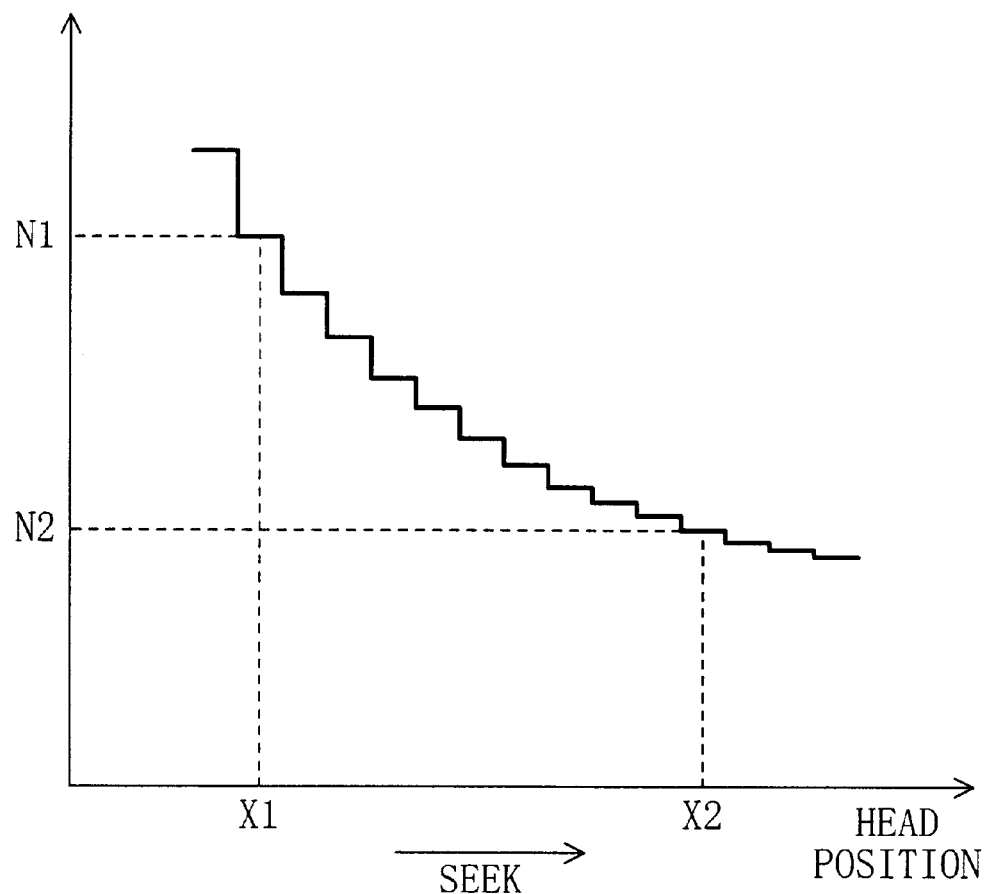

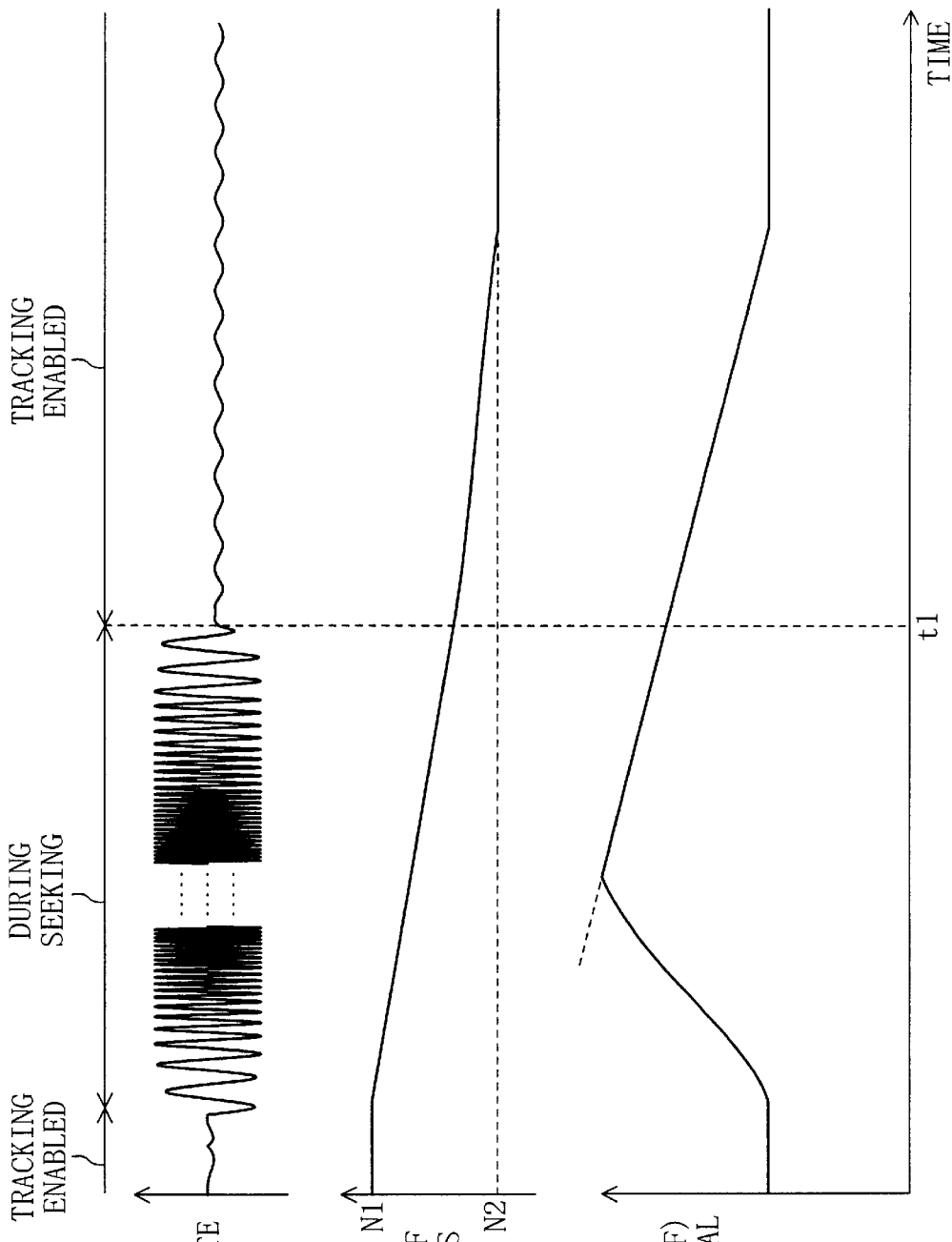

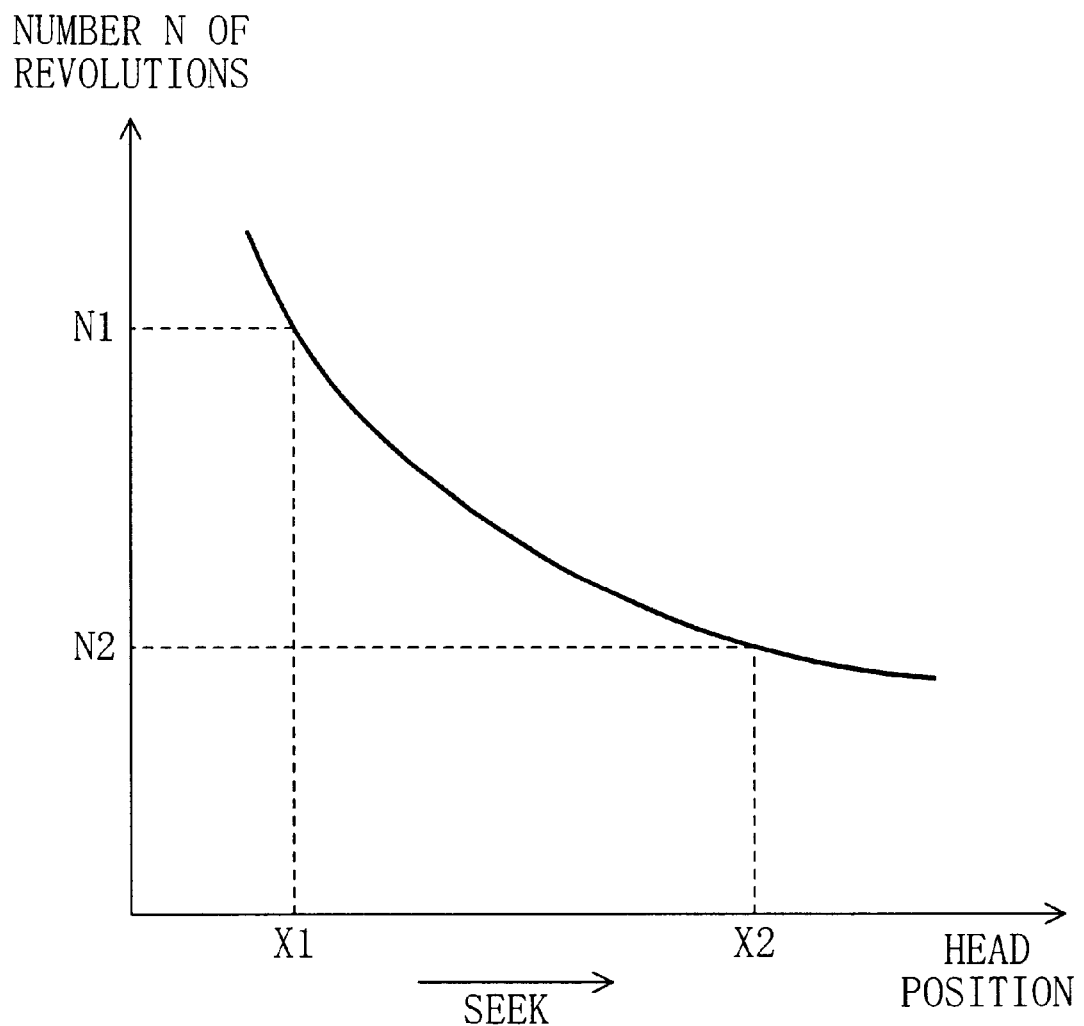

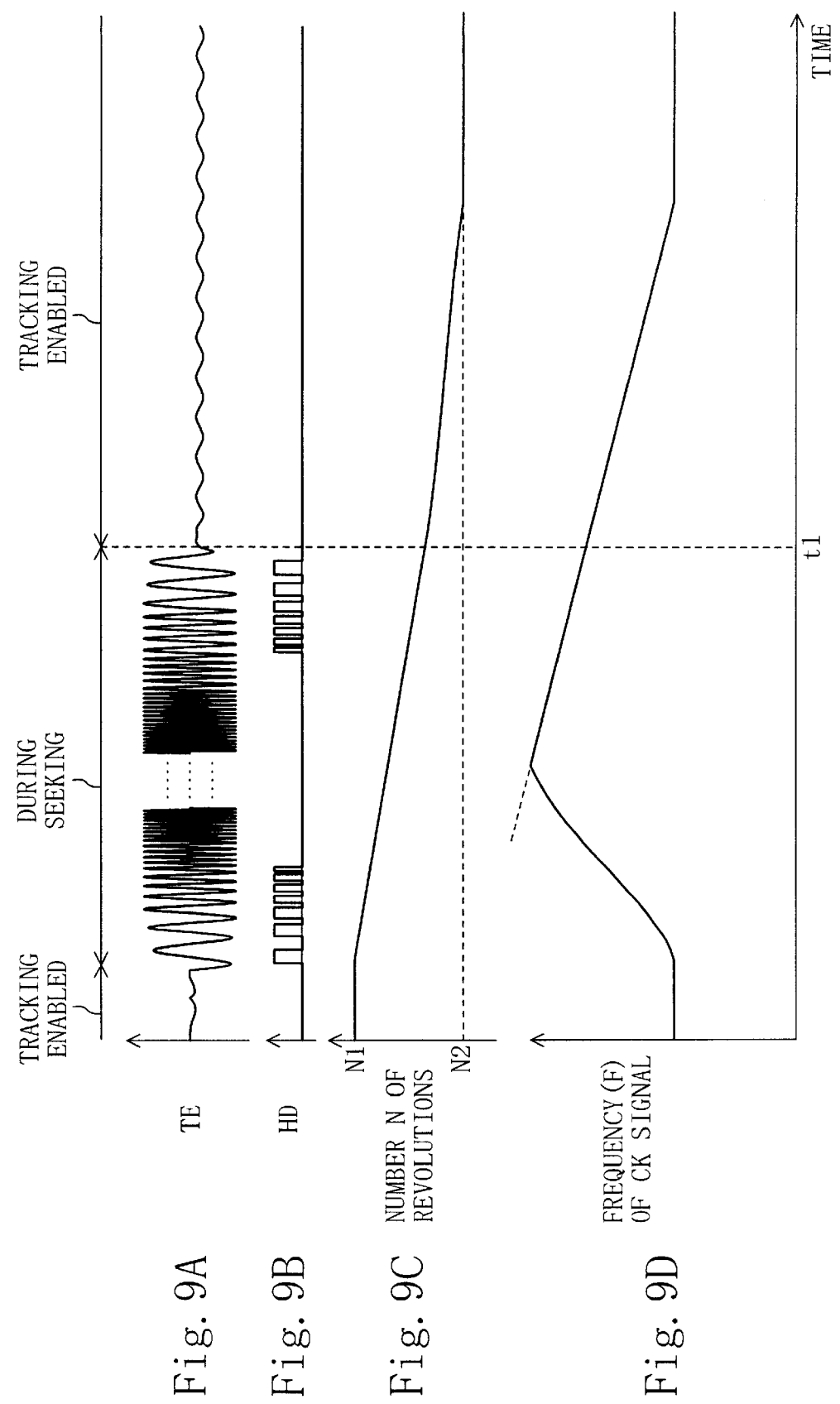

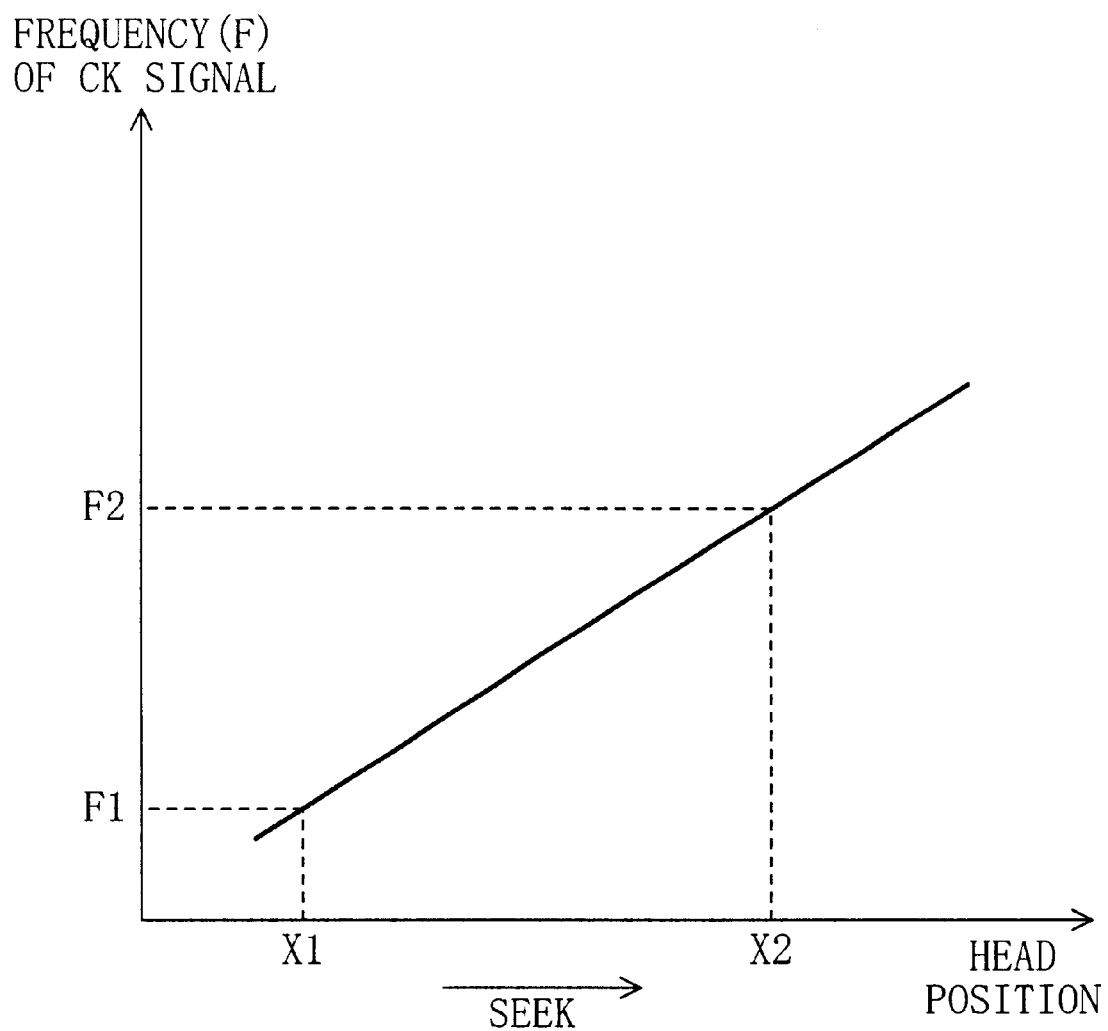

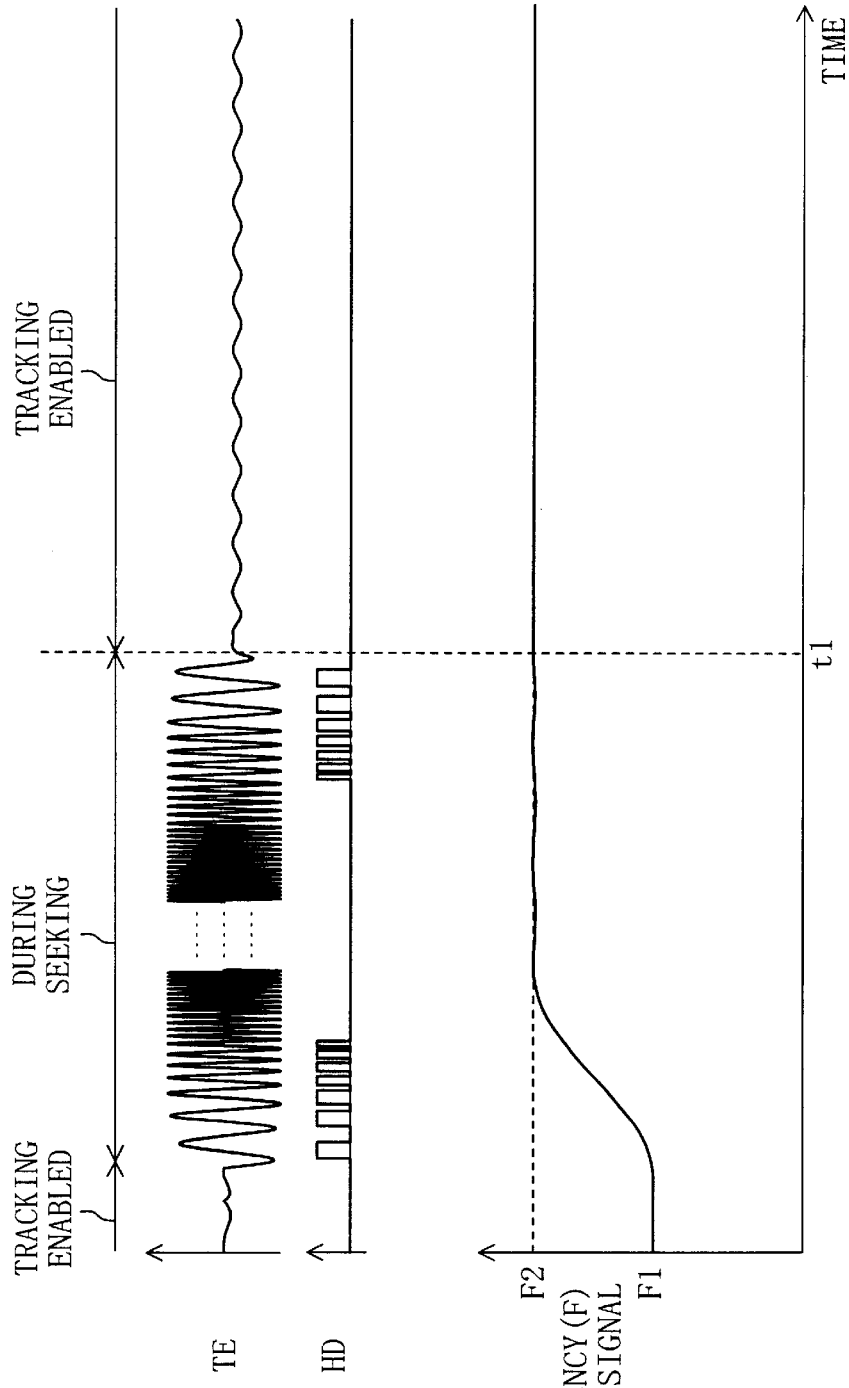
Fig. 14A  TE
Fig. 14B  HD
Fig. 14C  FREQUENCY (F) OF CK SIGNAL

OPTICAL DISK DRIVE

BACKGROUND OF THE INVENTION

The present invention generally relates to an optical disk drive for reading out information from a disk by irradiating a converged light beam onto the disk. More particularly, the present invention relates to the generation of a read clock signal used as a reference in reading data.

An optical disk, on which video information, computer data or the like has been recorded, is used widely as one of storage media of various types. In recent years, an optical disk is increasingly required to read out data and perform a seek operation at higher speeds.

While a tracking control is enabled, an optical disk drive reads out information from a read-only disk like a CD or DVD-ROM, and a read clock signal is controlled to have the phase thereof locked onto that of an RF signal resulting from light reflected from the disk. During a seek operation on the other hand, the optical disk drive moves a head unit toward the inner or outer periphery of the disk with the tracking control disabled. In such a state, the optical disk drive controls the ratio of the frequency of the read clock signal to that of a particular pattern included in the RF signal at a constant value.

In the conventional optical disk drive, however, if the seek speed is high, then the operation of detecting the particular pattern is disturbed or the response of a disk motor is delayed. Accordingly, the frequency of the read clock signal greatly deviates from a desired one, and therefore the phase locking control cannot be started as soon as the seek operation is finished. As a result, the start of data reading is adversely delayed.

Also, in reading out data from a recordable disk such as a DVD-RAM or DVD-R, the RF signal cannot be used because data does not exist on each and every track. Accordingly, while a data unrecorded area of the disk is being irradiated with a light beam, the frequency of the read clock signal cannot be fixed.

SUMMARY OF THE INVENTION

An object of the present invention is getting data reading started as soon as possible after a head has reached a position over a desired track on an optical disk through the seek operation.

Another object of the present invention is getting the frequency of a read clock signal fixed even when there is a data unrecorded area on a recordable disk.

An optical disk drive according to the present invention is adapted to read out information from a disk by irradiating a converged light beam onto the disk. The optical disk drive includes: means for rotating the disk; means for converting light reflected off the disk into an electric signal; clock generating means for generating a read clock signal with a variable frequency; phase locking control means for controlling the clock generating means in such a manner as to lock the phase of the read clock signal onto that of the electric signal; means for moving the light beam toward a target track on the disk; frequency control means for controlling the clock generating means in such a manner as to equalize the frequency of the read clock signal with a frequency expected at the target track; and switching means for deactivating the phase locking control means and activating the frequency control means at least just before the light beam has reached the target track.

Another optical disk drive according to the present invention is adapted to read out information from a disk, which includes a plurality of data portions and address portions, by irradiating a converged light beam onto the disk. Each said data portion has recordable wobbling tracks, while each said address portion is located between an adjacent pair of the data portions. An address has been recorded in advance on each said address portion. The optical disk drive includes: means for rotating the disk; means for converting light reflected off the disk into an electric signal; means for detecting a frequency of a wobbling component from the electric signal, the wobbling component corresponding to the shape of the tracks in each said data portion; clock generating means for generating a read clock signal with a variable frequency; phase locking control means for controlling the clock generating means in such a manner as to lock the phase of the read clock signal onto that of the electric signal; frequency control means for controlling the clock generating means such that a ratio of the frequency of the read clock signal to the detected frequency of the wobbling component becomes a constant value; and switching means for activating the phase locking control means while each said address portion is being irradiated with the light beam and for activating the frequency control means while each said data portion is being irradiated with the light beam.

BRIEF DESCRIPTION OF THE DRAWINGS

FIGS. 4A, 4B and 4C illustrate the configuration and operation of the wobble circuit shown in FIG. 2.

FIG. 6 is a graph illustrating a variation in number of revolutions of a motor with a head position during the CLV readout of a recordable disk.

FIGS. 7A, 7B and 7C illustrate how the PLL circuit shown in FIG. 3 operates before, while and after the seek operation is performed on the recordable disk.

FIG. 8 is a graph illustrating a variation in number of revolutions of a motor with a head position during the CLV readout of a read-only disk.

FIGS. 9A, 9B, 9C and 9D illustrate how the PLL circuit shown in FIG. 3 operates before, while and after the seek operation is performed on the read-only disk.

FIG. 13 is a graph illustrating a variation in frequency of a read clock signal with a head position during the CAV readout of a read-only disk.

FIGS. 14A, 14B and 14C illustrate how the PLL circuit shown in FIG. 10 operates before, while and after the seek operation is performed on the read-only disk.

DETAILED DESCRIPTION OF THE INVENTION

Hereinafter, preferred embodiments of the present invention will be described with reference to the accompanying drawings.

Figure 1A:
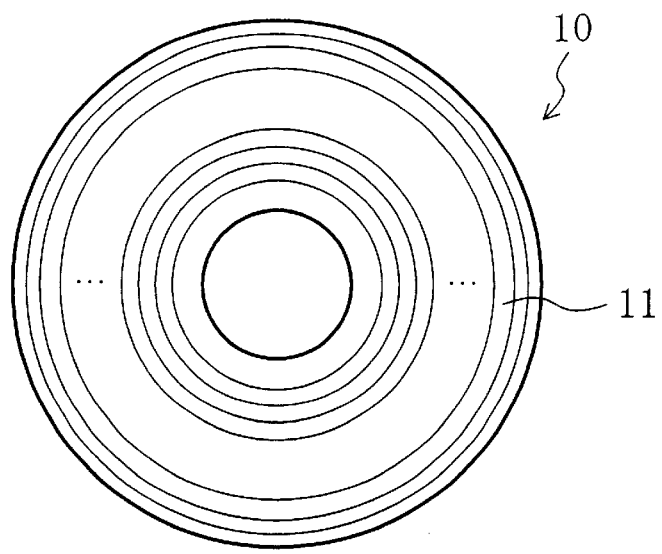
FIGS. 1A, 1B and 1C illustrate an exemplary structure for a recordable optical disk.
Figure 1B:
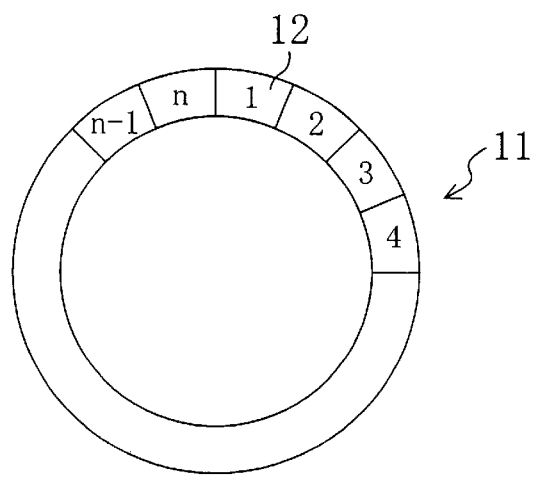
Figure 1C:
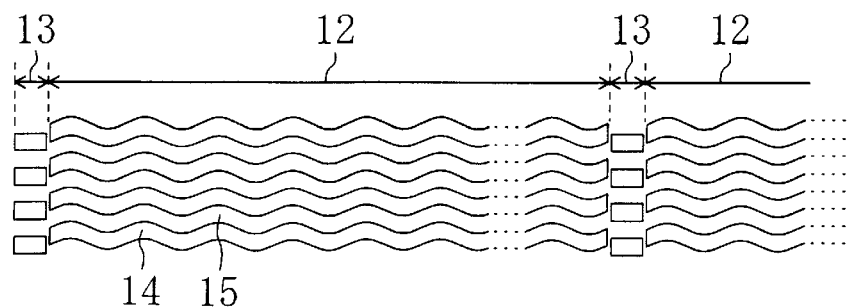

FIGS. 1A, 1B and 1C illustrate a recordable optical disk. As shown in FIG. 1A, an information area of the disk 10 is divided into a plurality of concentric zones 11. Information can be recorded on the information area such that a recording linear density gradually decreases toward the outermost track within each of these zones 11 and that a recording linear density on the innermost track is substantially constant in every zone 11. Each of these zones 11 is divided into a plurality of sectors (data portions) 12 as shown in FIG. 1B. More specifically, the disk 10 includes a plurality of data portions 12 and address portions 13 as shown in FIG. 1C. Each of the data portions 12 includes a plurality of recordable and wobbling tracks 14, 15. Each of the address portions 13 is located between an adjacent pair of data portions 12, and an address has been recorded in advance on the address portion 13. The tracks are further classified into convex land tracks 14 and concave groove tracks 15. A wobble pitch is preset at such a value that the period of a wobble signal component included in a tracking error signal is several hundred times as high as that of a read clock signal. Each address portion 13 is disposed to deviate from the nearest tracks by a half-track width in the radial direction of the disk such that the address recorded in the address portion 13 is readable either by the nearest land track 14 or groove track 15.

Figure 2:
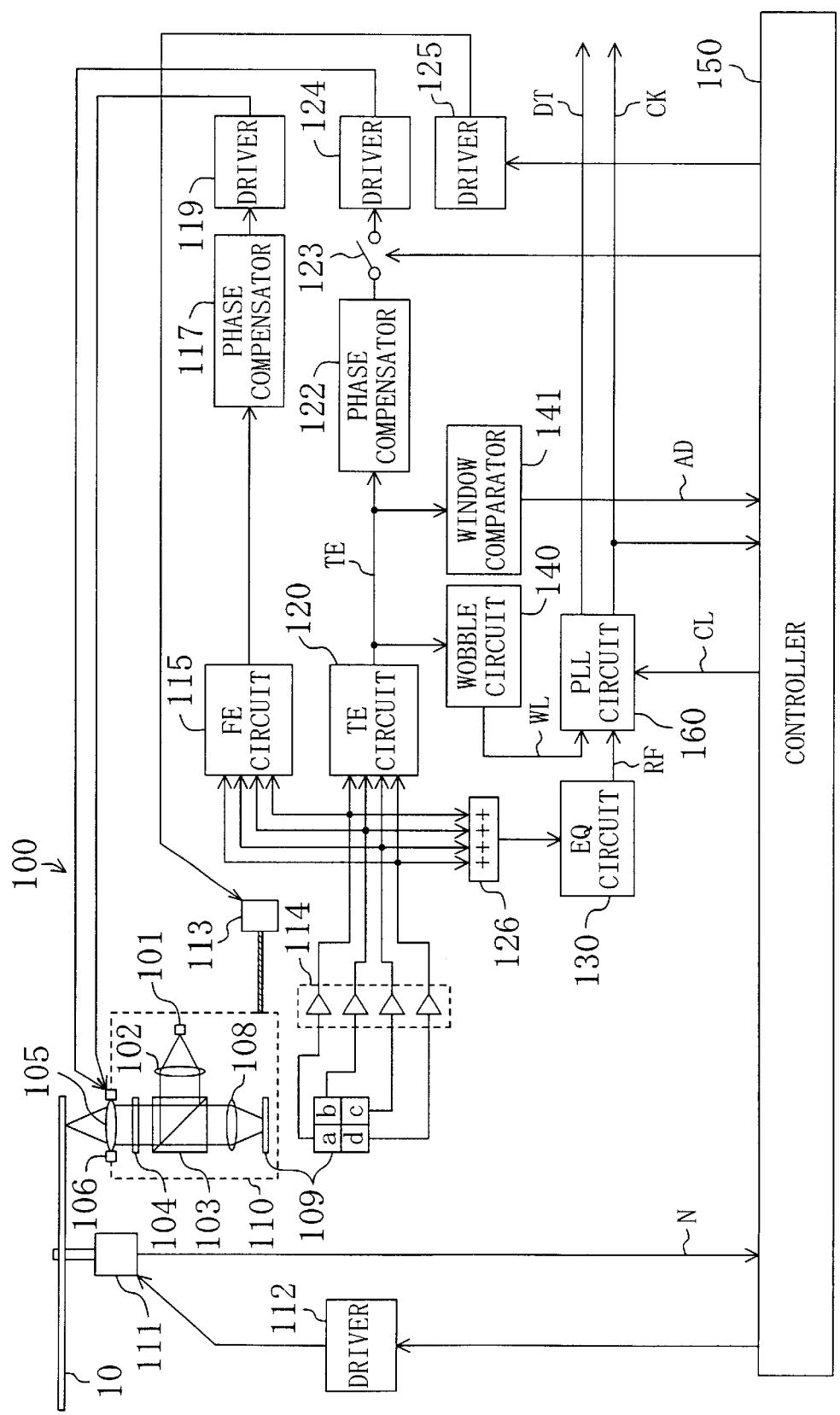
FIG. 2 is a block diagram illustrating an exemplary configuration for an optical disk drive according to the present invention.

FIG. 2 illustrates an exemplary configuration for an optical disk drive according to the present invention. The optical disk drive 100 shown in FIG. 2 is constructed to read out information from not only a read-only disk (not shown), on which information has been recorded at a substantially constant recording linear density over the entire recording area, but also a recordable disk 10 with such a structure as that illustrated in FIGS. 1A, 1B and 1C. The overall operation of the optical disk drive 100 is controlled by a controller 150. As shown in FIG. 2, a light beam, which has been emitted from a light source 101 like a semiconductor laser diode, is collimated by a collimator lens 102 into a parallel beam, which is reflected by a polarization beam splitter 103. Then, the beam is transmitted through a quarter-wave plate 104, converged by a converging lens 105 and then irradiated onto the disk 10, which is being rotated by a disk motor 111. The light reflected off the disk 10 passes through the converging lens 105, the quarter-wave plate 104, the polarization beam splitter 103 and a collective lens 108 and then enters a photodetector 109 for converting the incoming light into an electric signal. The converging lens 105 is attached to a movable portion of an actuator 106. When current is supplied to a focusing coil of the actuator 106, the converging lens 105 moves vertically to the information recording plane of the disk 10. On the other hand, when current is supplied to a tracking coil of the actuator 106, the converging lens 105 moves in the radial direction of the disk 10. The actuator 106, quarter-wave plate 104, polarization beam splitter 103, collimator lens 102, light source 101, collective lens 108 and photodetector 109 are attached to a head unit 110. A slider 113 for moving the head unit 110 toward a target track during a seek operation is driven by a driver 125 under the control of the controller 150. The controller 150 is informed of the number N of revolutions of the disk motor 111 and controls the number of revolutions of the disk motor 111 via a driver 112 depending on whether constant linear velocity (CLV) readout or constant angular velocity (CAV) readout is selected.

The output of the photodetector 109, which consists of four signals a through d, is passed through an amplifier 114 and then input to a focus error (FE) circuit 115. Responsive to the output of the amplifier 114, the FE circuit 115 outputs an FE signal representing a positional error between the focal point of the light beam and the information recording plane. The FE signal is transmitted to the focusing coil of the actuator 106 via a phase compensator 117 for compensating a phase and a power amplifying driver 119, thereby controlling the converging lens 105 such that the focal point of the light beam is located on the information recording plane.

The output of the photodetector 109 is also input to a tracking error (TE) circuit 120 after having been passed through the amplifier 114. The TE circuit 120 outputs a TE signal representing a positional error between the focal point of the light beam and a target track. The TE signal is transmitted to the tracking coil of the actuator 106 via another phase compensator 122, a switch 123 and a power amplifying driver 124, thereby controlling the converging lens 105 in such a manner as to locate the focal point of the light beam on a target track. The switch 123 is selectively turned ON/OFF to get the tracking control started or stopped by the controller 150.

The output of the photodetector 109 is further input to an equalizer (EQ) circuit 130 for amplifying a specified frequency band after having been passed through the amplifier 114 and an adder 126. The EQ circuit 130 supplies an RF signal, which represents information read out, to a phase-locked loop (PLL) circuit 160. The PLL circuit 160 receives various control signals CL from the controller 150 and outputs a data (DT) signal and a read clock (CK) signal to a data demodulator (not shown).

The optical disk drive 100 shown in FIG. 2 further includes a wobble circuit 140 and a window comparator 141 for reading out information from the recordable disk 10. The wobble circuit 140 generates a wobble (WL) signal, corresponding to the shape of the track 14 or 15, from the TE signal, and supplies the WL signal to the PLL circuit 160. The window comparator 141 generates an address detection (AD) signal, indicating a timing when the address portion 13 was irradiated with the light beam, from the TE signal. The AD signal, along with the CK signal, is supplied to the controller 150.

Figure 3:
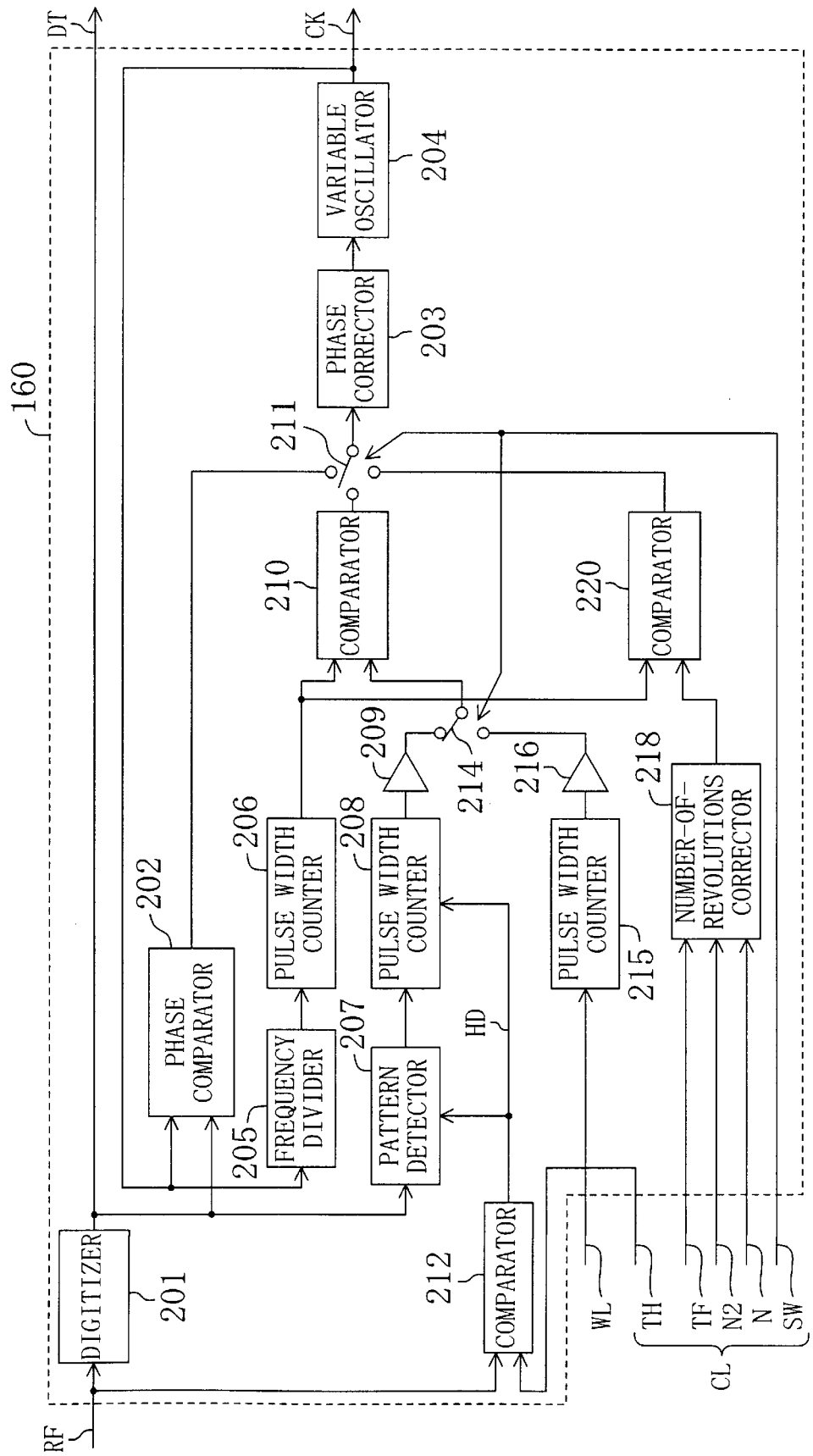
FIG. 3 is a block diagram illustrating an exemplary configuration for the PLL circuit shown in FIG. 2.

FIG. 3 illustrates an exemplary configuration for the PLL circuit 160 shown in FIG. 2 and applicable to the CLV readout. The RF signal, which has been input to the PLL circuit 160, is digitized by a digitizer 201 and output as the DT signal. In reading data with the tracking control enabled, the phase of the DT signal is compared to that of the CK signal by a phase comparator 202, which outputs a signal corresponding to a phase difference between these signals. This phase difference signal passes through a switch 211, which is selectively turned responsive to a switching (SW) signal supplied from the controller 150. Then, the phase of the phase difference signal is corrected by a phase corrector 203. And the phase-corrected signal is input to a variable oscillator 204. The variable oscillator 204 changes the oscillation frequency thereof depending on the input signal, and outputs an oscillation signal, which is controlled to have its phase locked to that of the DT signal and then output as the CK signal.

In performing a read operation on a read-only disk (not shown), if the tracking control is disabled or if data cannot be read out, then the controller 150 controls the ratio of the frequency of the CK signal to that of a particular pattern contained in the RF signal at constant value by turning the switch 211. For example, suppose the period of the CK signal is identified by T. In reading out data from a CD, the controller 150 controls the ratio of the frequency of the CK signal to an 11T signal, which is the longest pattern contained in the RF signal, at 1:11. In reading out data from a DVD-ROM, the controller 150 controls the ratio of the frequency of the CK signal to a 14T signal, which is the longest pattern contained in the RF signal, at 1:14. In this case, the particular pattern is detected by a particular pattern detector 207. The pattern length of the particular pattern is counted by a pulse width counter 208 responsive to clock pulses with a fixed frequency. And the count is amplified by an amplifier 209, passed through a switch 214, which is selectively turned responsive to the SW signal, and then input to a comparator 210. Also, the frequency of the CK signal is divided by a frequency divider 205 and then the period thereof is counted by a pulse width counter 206. The counted length of the frequency-divided CK signal and the amplified length of the particular pattern are input to the comparator 210, which outputs a control signal responsive thereto. The control signal is passed through the switch 211 and the phase corrector 203 and then input to the variable oscillator 204. In this manner, the frequency ratio of the CK signal to the particular pattern is controlled at a constant value.

While the tracking control is disabled, the RF signal cannot be read properly between tracks. In this case, no effective RF signal is detected, and the particular pattern detector 207 operates erroneously to make the frequency of the CK signal lower than a desired frequency. Accordingly, the RF signal is compared to a threshold level (TH) signal by a comparator 212. If the amplitude of the RF signal is equal to or less than a predetermined value, then the comparator 212 outputs a hold (HD) signal. Responsive to the HD signal, the particular pattern detector 207 and the pulse width counter 208 are deactivated for a while between tracks, thereby preventing the operation from being disturbed between the tracks.

In reading out data from a read-only disk, the controller 150 turns the switch 123 ON to get the tracking control started. Once the frequency ratio of the CK signal to the particular pattern in the RF signal is stabilized at a substantially constant value, the controller 150 turns the switch 211, thereby starting a phase locking control between the DT and CK signals.

In reading out data from the recordable disk 10, a pulse width counter 215 counts the period of the WL signal. The count is amplified by an amplifier 216, passed through the switch 214, which is selectively turned by the controller 150, and then input to the comparator 210. The comparator 210 outputs a control signal to control a ratio of the period of the CK signal to that of the WL signal at a constant value. The control signal is passed through the switch 211 and the phase corrector 203 and then input to the variable oscillator 204. As a result, the frequency control is performed such that the frequency ratio of the CK signal to the WL signal becomes a constant value.

The PLL circuit shown in FIG. 3 further includes a number-of-revolutions corrector 218 and a comparator 220 applicable to a seek operation during the CLV readout. The number-of-revolutions corrector 218 receives a target period (or target frequency) TF of the CK signal required for attaining a predetermined data read frequency, a current number N of revolutions of the disk motor 111 and a target number N2 of revolutions from the controller 150. In response thereto, the corrector 218 outputs a correction target value obtained by multiplying a ratio N/N2 of the current number N to the target number N2 by the target period (or target frequency) TF. The comparator 220 compares the output of the corrector 218 to the period of the frequency-divided CK signal, thereby controlling the variable oscillator 204 via the switch 211 such that the frequency of the CK signal is equalized with the data read frequency at the seek destination.

FIGS. 4A, 4B and 4C illustrate the configuration and operation of the wobble circuit 140 shown in FIG. 2. The wobble circuit 140 includes a band pass filter (BPF) 140a and a digitizer 140b as shown in FIG. 4A. The BPF 140a generates a wobble detection (WD) signal from the TE signal. The WD signal is converted by the digitizer 140b into the WL signal. FIGS. 4B and 4C illustrate respective waveforms of the WD and WL signals. In FIGS. 4B and 4C, T12 denotes a data interval during which the data portion 12 is being irradiated with the light beam, while T13 denotes an address interval during which the address portion 13 is being irradiated with the light beam. In the data interval T12, the WD signal shows a frequency component corresponding to the wobble pitch of the track 14, 15 that has been extracted from the TE signal. FIG. 4C illustrates a variation in frequency of the WL signal.

Figures 5A, 5B, 5C:
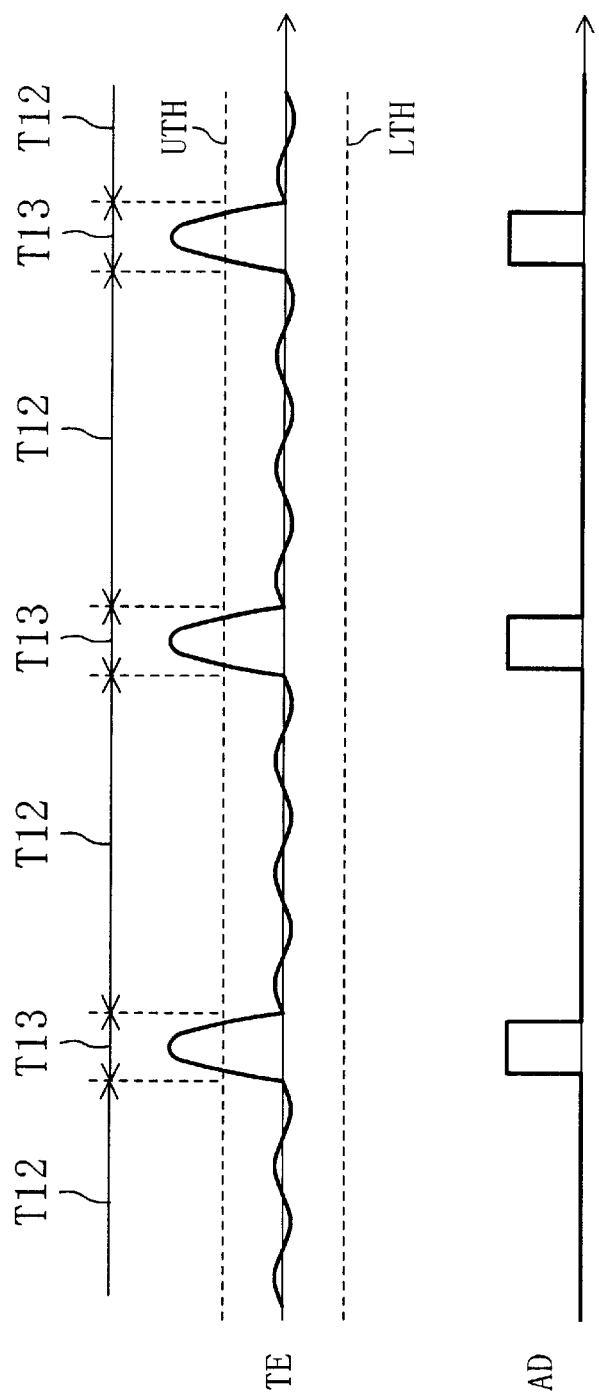
FIGS. 5A, 5B and 5C illustrate how the optical disk drive shown in FIG. 2 operates in reading out information from a recordable disk.

FIGS. 5A, 5B and 5C illustrate how the optical disk drive 100 shown in FIG. 2 operates in reading out information from the recordable disk 10. FIGS. 5A and 5B illustrate the operation of the window comparator 141. Since each address portion 13 is deviated from the nearest data portion 12 by a half track width, the amplitude of the TE signal is larger in the address interval T13 than in the data interval T12. The window comparator 141 generates an AD signal pulse if the level of the TE signal is either higher than an upper threshold level (UTH) or lower than a lower threshold level (LTH). Based on the AD signal supplied from the window comparator 141, the controller 150 can distinguish the data and address portions 12 and 13 from each other. FIG. 5C illustrates the SW signal supplied from the controller 150 to the switches 211 and 214. Specifically, in the data interval T12, the frequency control is selectively performed by the comparator 210 responsive to the WL signal to determine the frequency of the CK signal. On the other hand, in the address interval T13, the phase locking control is selectively performed by the phase comparator 202 on the DT and CK signals. Thus, even if the data portion 12 has not been recorded yet, the frequency of the CK signal does not deviate because the frequency control is performed based on the WL signal. Also, since the mode of control is switched into phase locking with respect to the address portion 13, the address can be read out constantly. In reading out data that has been recorded on the data portion 12, the controller 150 selects the phase locking control by turning the switch 211. As a result, the CK signal is controlled to have its phase locked onto that of the DT signal reflecting the data read out.

It should be noted that the CK signal may also be controlled to have its phase locked onto the WL signal. In such a case, however, once these signals are out of phase with each other, it takes a rather long time to reestablish the in-phase state. Accordingly, it is more advantageous to perform the frequency control exemplified above. Also, the pulse width counter 208 and the amplifier 209 may also be used for detecting a period of the WL signal instead of the pulse width counter 215 and the amplifier 216. In such a case, the overall circuit size can be reduced. Thus, such a configuration is more advantageous in terms of circuit size and cost than using a synthesizer for generating reference clock pulses as is found in a conventional magneto-optical disk (MO) drive.

Next, a seek operation performed on the recordable disk 10 will be described with reference to FIGS. 6, 7A, 7B and 7C. FIG. 6 illustrates a variation in number N of revolutions of the disk motor 111 with a head position during the CLV readout of the recordable disk 10. FIGS. 7A, 7B and 7C illustrate how the PLL circuit 160 shown in FIG. 3 operates before, while and after the seek operation is performed on the recordable disk 10.

The switch 214 has been turned to such a direction as passing the output of the amplifier 216. On the other hand, the switch 211 is turned to selectively perform the frequency control using the WL signal with respect to the data portion 12 or the phase locking control using the DT signal with respect to the address portion 13. In such a state, the controller 150 turns the switch 123 OFF and sends a signal to the driver 125 to drive the slider 113, thereby moving the head unit 110 to the target track position. While the head unit 110 is being moved with the switch 123 turned OFF, the controller 150 turns the switch 211 to such a direction as passing the output of the comparator 220.

During the CLV readout of the recordable disk 10, a ZCLV control is performed in such a manner as to change the number N of revolutions of the disk motor 111 with the zone 11 to which a head position belongs as shown in FIG. 6. However, suppose the head unit 110 has been moved from a position X1 (corresponding to a number N1 of revolutions) to a position X2 (corresponding to a number N2 of revolutions) at a high speed. In such a situation, if the response of the disk motor 111 is delayed, then an actual number N of revolutions deviates from the target number N2 of revolutions. In other words, since the actual linear velocity is different from the defined one, a data read frequency also differs from a predetermined read frequency. As described above, the number-of-revolutions corrector 218 receives a target period TF of the CK signal required for attaining a predetermined data read frequency, a current number N of revolutions of the disk motor 111 and a target number N2 of revolutions from the controller 150. In response thereto, the corrector 218 outputs a correction target value obtained by multiplying a ratio N/N2 of the current number N to the target number N2 by the target period TF. The comparator 220 compares the output of the corrector 218 to the period of the frequency-divided CK signal, thereby controlling the variable oscillator 204 via the switch 211 such that the frequency of the CK signal is equalized with the data read frequency at the seek destination. And at a point in time t1 when the head unit 110 reaches the target position, the controller 150 turns the switch 123 ON to get the tracking control started as shown in FIGS. 7A, 7B and 7C. Thereafter, the controller 150 will have the output of the comparator 210 passed with respect to the data portion 12 and the output of the phase comparator 202 passed with respect to the address portion 13 by turning the switch 211.

As can be seen, even if the response of the disk motor 111 is delayed, the frequency of the CK signal has already been approximately equalized according to the present invention with the data read frequency at a point in time the head unit 110 reaches the target position. Accordingly, it is possible to read an address out as soon as the seek operation is finished, thus shortening the interval between end of seeking and start of data reading.

Next, a seek operation performed on a read-only disk will be described with reference to FIGS. 8, 9A, 9B, 9C and 9D. FIG. 8 illustrates a variation in number N of revolutions of the disk motor 111 with a head position during the CLV readout of the read-only disk. FIGS. 9A, 9B, 9C and 9D illustrate how the PLL circuit 160 shown in FIG. 3 operates before, while and after the seek operation is performed on the read-only disk.

The switch 214 has been turned to such a direction as passing the output of the amplifier 209. On the other hand, the switch 211 has been turned to such a direction as passing the output of the phase comparator 202. That is to say, a phase locking control is being performed on the CK and DT signals. In such a state, the controller 150 turns the switch 123 OFF and sends a signal to the driver 125 to drive the slider 113, thereby moving the head unit 110 to the target track position. While the head unit 110 is being moved with the switch 123 turned OFF, the controller 150 turns the switch 211 to such a direction as passing the output of the comparator 220. As shown in FIG. 9B, when the track crossing velocity gets high during the seek operation, the output of the HD signal is suspended.

During the CLV readout of the read-only disk, the number N of revolutions of the disk motor 111 is continuously changed with a head position as shown in FIG. 8. However, suppose the head unit 110 has been moved from the position X1 (corresponding to the number N1 of revolutions) to the position X2 (corresponding to the number N2 of revolutions) at a high speed. In such a situation, if the response of the disk motor 111 is delayed, then the actual number N of revolutions deviates from the target number N2 of revolutions. In other words, since the actual linear velocity is different from the defined one, a data read frequency also differs from a predetermined read frequency. As described above, the number-of-revolutions corrector 218 receives a target period TF of the CK signal required for attaining a predetermined data read frequency, a current number N of revolutions of the disk motor 111 and a target number N2 of revolutions from the controller 150. In response thereto, the corrector 218 outputs a correction target value obtained by multiplying a ratio N/N2 of the current number N to the target number N2 by the target period TF. The comparator 220 compares the output of the corrector 218 to the period of the frequency-divided CK signal, thereby controlling the variable oscillator 204 via the switch 211 such that the frequency of the CK signal is equalized with the data read frequency at the seek destination. And at a point in time t1 when the head unit 110 reaches the target position, the controller 150 turns the switch 211 to such a direction as passing the output of the comparator 210 and turns switch 123 ON to get the tracking control started as shown in FIGS. 9A, 9B, 9C and 9D. Thereafter, at a point in time the frequency ratio of the CK signal to a particular pattern contained in the RF signal reaches a constant value, the controller 150 further turns the switch 211 to restart the phase locking control on the DT and CK signals.

As can be seen, even if the response of the disk motor 111 is delayed, the frequency of the CK signal has already been approximately equalized according to the present invention with the data read frequency at a point in time the head unit 110 reaches the target position. Accordingly, it is possible to start the phase locking control as soon as the seek operation is finished, thus shortening the interval between end of seeking and start of data reading.

Figure 10:
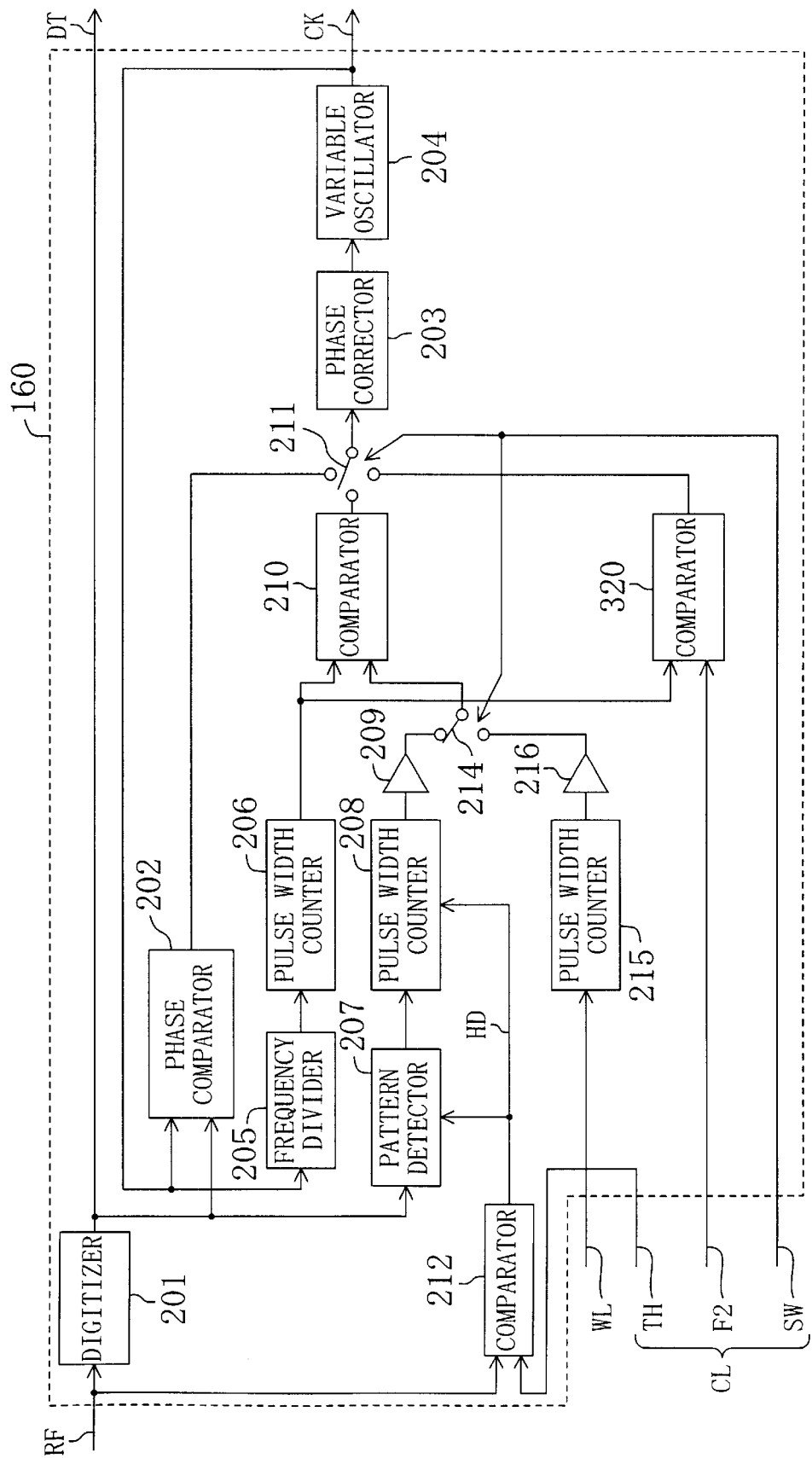
FIG. 10 is a block diagram illustrating another exemplary configuration for the PLL circuit shown in FIG. 2.

FIG. 10 illustrates another exemplary configuration for the PLL circuit 160 shown in FIG. 2 and applicable to CAV readout. In the PLL circuit 160 shown in FIG. 10, the number-of-revolutions corrector 218 and the comparator 220 shown in FIG. 2 are replaced with a comparator 320. The comparator 320 receives a target frequency F2 (or target period) of the CK signal required for attaining a predetermined data read frequency, thereby controlling the variable oscillator 204 via the switch 211 such that the frequency of the CK signal is equalized with the data read frequency at the seek destination.

Figure 11:
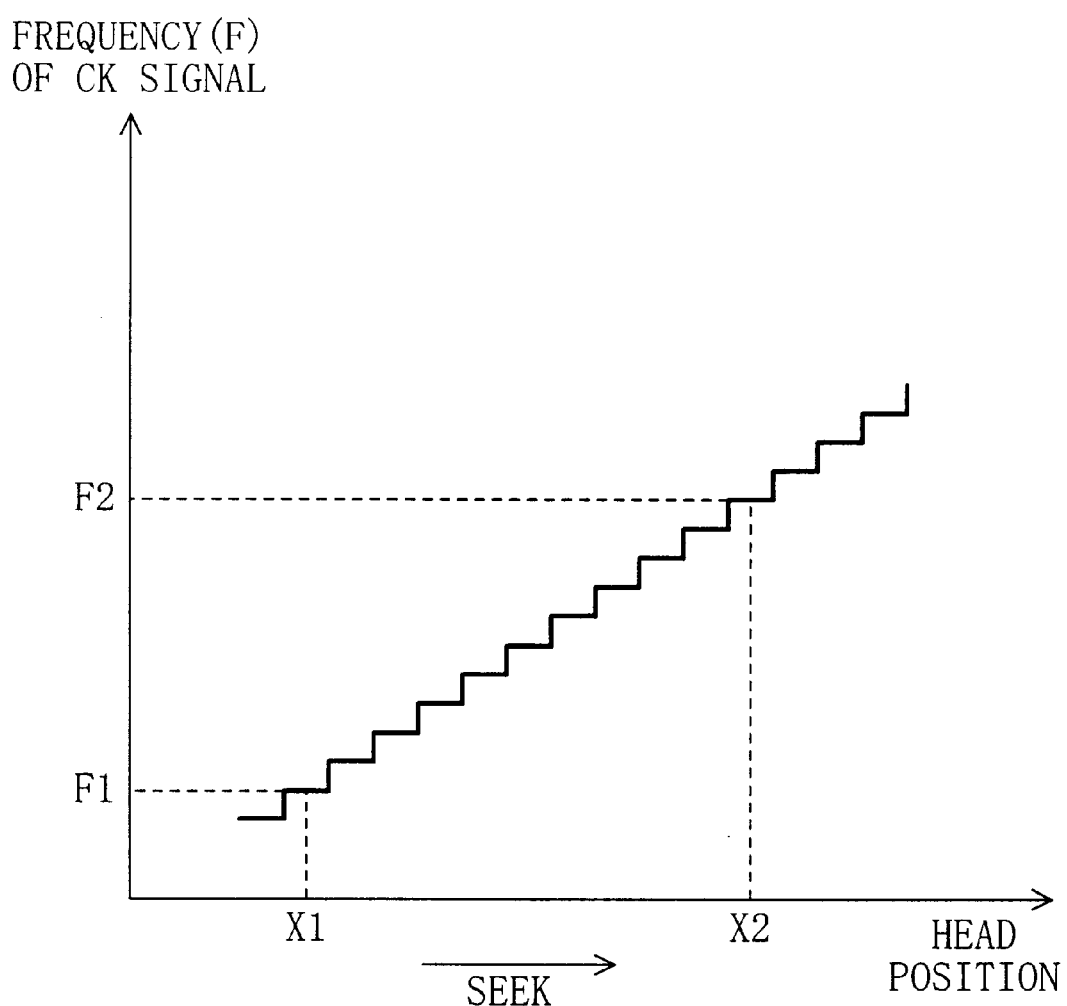
FIG. 11 is a graph illustrating a variation in frequency of a read clock signal with a head position during the CAV readout of a recordable disk.
Figures 12A, 12B:
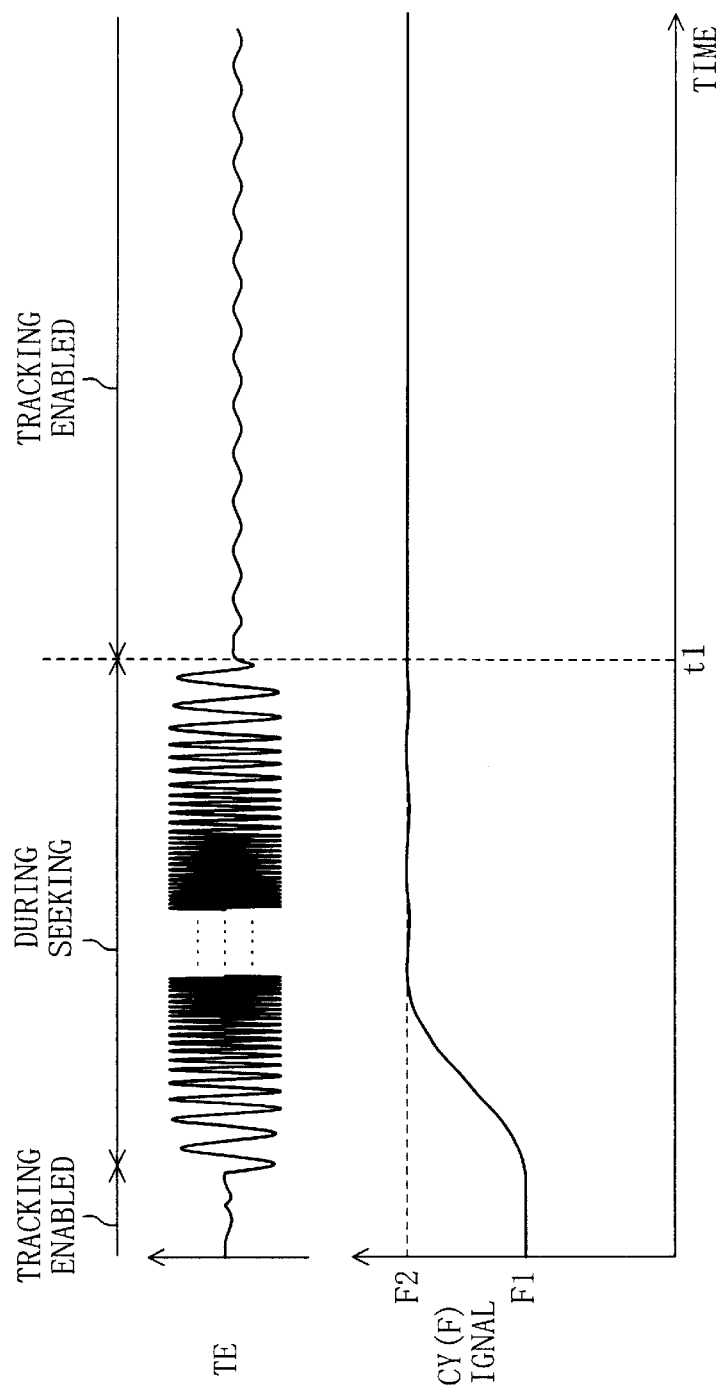
FIGS. 12A and 12B illustrate how the PLL circuit shown in FIG. 10 operates before, while and after the seek operation is performed on the recordable disk.

Next, a seek operation performed on the recordable disk 10 will be described with reference to FIGS. 11, 12A and 12B. FIG. 11 illustrates a variation in frequency F of the CK signal with a head position during the CAV readout of the recordable disk 10. In this case, the number of revolutions of the disk motor 111 is kept substantially constant. FIGS. 12A and 12B illustrate how the PLL circuit 160 shown in FIG. 10 operates before, while and after the seek operation is performed on the recordable disk 10.

The switch 214 has been turned to such a direction as passing the output of the amplifier 216. On the other hand, the switch 211 is turned to selectively perform the frequency control using the WL signal with respect to the data portion 12 or the phase locking control using the DT signal with respect to the address portion 13. In such a state, the controller 150 turns the switch 123 OFF and sends a signal to the driver 125 to drive the slider 113, thereby moving the head unit 110 to the target track position. While the head unit 110 is being moved with the switch 123 turned OFF, the controller 150 turns the switch 211 to such a direction as passing the output of the comparator 320.

During the CAV readout of the recordable disk 10, the frequency F of the CK signal is changed with the zone 11 to which a head position belong as shown in FIG. 11. For example, if the head unit 110 has been moved from the position X1 to the position X2, then the frequency F of the CK signal changes from F1 into F2. Thus, the controller 150 supplies a target frequency F2 (or target period) of the CK signal, which is approximately equal to a data read frequency in a seek destination zone, to the comparator 320. As a result, the frequency of the CK signal is controlled at a value approximately equal to the data read frequency in the seek destination zone during the seek operation as shown in FIG. 12B. And at a point in time t1 when the head unit 110 reaches the target position, the controller 150 turns the switch 123 ON to get the tracking control started. Thereafter, the controller 150 will have the output of the comparator 210 passed with respect to the data portion 12 and the output of the phase comparator 202 passed with respect to the address portion 13 by turning the switch 211.

As can be seen, even if the data read frequency differs among the seek destination zones, the frequency of the CK signal has already been approximately equalized according to the present invention with the data read frequency at a point in time the head unit 110 reaches the target position. Accordingly, it is possible to read an address out as soon as the seek operation is finished, thus shortening the interval between end of seeking and start of data reading.

Next, a seek operation performed on a read-only disk will be described with reference to FIGS. 13, 14A, 14B and 14C. FIG. 13 illustrates a variation in frequency F of the CK signal with a head position during the CAV readout of the read-only disk. In this case, the number of revolutions of the disk motor 111 is kept substantially constant. FIGS. 14A, 14B and 14C illustrate how the PLL circuit 160 shown in FIG. 10 operates before, while and after the seek operation is performed on the read-only disk.

The switch 214 has been turned to such a direction as passing the output of the amplifier 209. On the other hand, the switch 211 has been turned to such a direction as passing the output of the phase comparator 202. That is to say, a phase locking control is being performed on the CK and DT signals. In such a state, the controller 150 turns the switch 123 OFF and sends a signal to the driver 125 to drive the slider 113, thereby moving the head unit 110 to the target track position. While the head unit 110 is being moved with the switch 123 turned OFF, the controller 150 turns the switch 211 to such a direction as passing the output of the comparator 320. As shown in FIG. 14B, when the track crossing velocity gets high during the seek operation, the output of the HD signal is suspended.

During the CAV readout of the read-only disk, the frequency F of the CK signal is continuously changed with a head position as shown in FIG. 13. For example, if the head unit 110 has been moved from the position X1 to the position X2, then the frequency F of the CK signal changes from F1 into F2. Thus, the controller 150 supplies a target frequency F2 (or target period) of the CK signal, which is approximately equal to a data read frequency on a seek destination track, to the comparator 320. As a result, the frequency of the CK signal is controlled at a value approximately equal to the data read frequency on the seek destination track during the seek operation as shown in FIG. 14C. And at a point in time t1 when the head unit 110 reaches the target position, the controller 150 turns the switch 211 to such a direction as passing the output of the comparator 210 and turns the switch 123 ON to get the tracking control started. Thereafter, at a point in time the frequency ratio of the CK signal to a particular pattern contained in the RF signal reaches a constant value, the controller 150 further turns the switch 211 to restart the phase locking control on the DT and CK signals.

As can be seen, even if the data read frequency differs among the seek destination tracks, the frequency of the CK signal has already been approximately equalized according to the present invention with the data read frequency at a point in time the head unit 110 reaches the target position. Accordingly, it is possible to restart the phase locking control as soon as the seek operation is finished, thus shortening the interval between end of seeking and start of data reading.

In the foregoing example of CLV readout, correction is performed based on the target number N2 of revolutions of the disk motor 111. However, if the number of revolutions is greatly changeable, then the next number of revolutions may be much different from the current number of revolutions. Thus, the error might be significant even if correction is performed. Alternatively, the correction may also be performed more accurately in the following manner. First, the next number of revolutions is obtained by first-order linear interpolation from a previous number Nold of revolutions and the current number N of revolutions. And the target period of the CK signal is multiplied by (2×N−Nold)/N2 using the next number obtained and the target number N2 at a seek destination. Among other things, if the head unit 110 should be moved over a long distance, then the number of revolutions is changeable even more greatly. Thus, this processing is particularly effective in such a situation.

Also, in the foregoing example of reading out information from a read-only disk, the switch 211 is turned to such a direction as passing the output of the comparator 210 when the head unit 110 reaches the target position. Alternatively, the switch 211 may be turned at a point in time when the moving velocity of the head unit 110 gets equal to or lower than the normal rate of the RF and HD signals. In such a case, the phase locking control may be started more quickly, and therefore, the interval between end of seeking and start of data reading can be further shortened.

Furthermore, in each of the foregoing examples, the switch 211 is turned to such a direction as passing the output of the comparator 210 when the head unit 110 reaches the target position. However, if the frequency control or the head unit move control can be performed with sufficiently high precision, then the frequency of the CK signal is controlled approximately at the target frequency at an earlier stage. Accordingly, the switch 211 may be turned to pass the output of the phase comparator 202 as soon as the seek operation is finished. In such a case, the phase locking control using the output of the phase comparator 202 is started immediately, and therefore, the interval between end of seeking and start of data reading can be further shortened.

In the example shown in FIG. 10, the target frequency (or target period) of the CK signal is supposed to be fixed during the seek operation. If the number of revolutions of the disk motor 111 is greatly changeable or if the control error is significant, then the target frequency (or target period) of the CK signal may be corrected based on the current and target numbers N and N2 of revolutions of the disk motor 111 as in FIG. 3. In such a case, the CK signal can be controlled with even higher precision and a PLL circuit with the same configuration may be used for both the CLV and CAV readout operations. As a result, the circuit configuration and control procedure can be both simplified.

What is claimed is:

1. An optical disk drive for reading out information from a disk by irradiating a converged light beam onto the disk, the optical disk drive comprising:

means for rotating the disk;

means for converting light reflected off the disk into an electric signal;

clock generating means for generating a read clock signal with a variable frequency;

phase locking control means for controlling the clock generating means in such a manner as to lock the phase of the read clock signal onto that of the electric signal;

means for moving the light beam toward a target track on the disk;

frequency control means for controlling the clock generating means in such a manner as to equalize the frequency of the read clock signal with a frequency expected at the target track; and switching means for deactivating the phase locking control means and activating the frequency control means at least just before the light beam has reached the target track.

2. The optical disk drive of claim 1, wherein information has been recorded on the disk such that a recording linear density is substantially constant over an entire information area thereof, and wherein the optical disk drive further includes means for detecting a revolving velocity of the disk, the velocity being changeable with a position of the light beam, and wherein the frequency control means controls the clock generating means such that the frequency of the read clock signal is determined based on the detected velocity of the disk and a target revolving velocity at the target track.

3. The optical disk drive of claim 1, wherein information has been recorded on the disk such that a recording linear density is substantially constant over an entire information area thereof, and wherein the optical disk drive further includes means for keeping a revolving velocity of the disk substantially constant, and wherein the frequency control means controls the clock generating means such that the frequency of the read clock signal is equalized with a target frequency at the target track.

4. The optical disk drive of claim 1, wherein information has been recorded on the disk, which includes an information area divided into a plurality of concentric zones, such that a recording linear density decreases toward an outermost track in each said zone and that a recording linear density on an innermost track is substantially constant in every said zone, and wherein the optical disk drive further includes means for detecting a revolving velocity of the disk, the velocity being changeable with a position of the light beam, and wherein the frequency control means controls the clock generating means such that the frequency of the read clock signal is determined based on the detected velocity of the disk and a target revolving velocity in one of the zones, to which the target track belongs.

5. The optical disk drive of claim 1, wherein information has been recorded on the disk, which includes an information area divided into a plurality of concentric zones, such that a recording linear density decreases toward an outermost track in each said zone and that a recording linear density on an innermost track is substantially constant in every said zone, and wherein the optical disk drive further includes means for keeping a revolving velocity of the disk substantially constant, and wherein the frequency control means controls the clock generating means such that the frequency of the read clock signal is equalized with a target frequency in one of the zones, to which the target track belongs.

6. The optical disk drive of claim 1, wherein the switching means continuously deactivates the phase locking control means and activates the frequency control means while the light beam is being moved to the target track.

7. The optical disk drive of claim 1, wherein the switching means deactivates the frequency control means and activates the phase locking control means when the light beam reaches the target track.

8. An optical disk drive for reading out information from a disk by irradiating a converged light beam onto the disk, the disk including a plurality of data portions and address portions, each said data portion having recordable wobbling tracks, each said address portion being located between an adjacent pair of the data portions, an address having been recorded in advance on each said address portion, the optical disk drive comprising:

means for rotating the disk;

means for converting light reflected off the disk into an electric signal;

means for detecting a frequency of a wobbling component from the electric signal, the wobbling component corresponding to the shape of the tracks in each said data portion;

clock generating means for generating a read clock signal with a variable frequency;

phase locking control means for controlling the clock generating means in such a manner as to lock the phase of the read clock signal onto that of the electric signal;

frequency control means for controlling the clock generating means such that a ratio of the frequency of the read clock signal to the detected frequency of the wobbling component becomes a constant value; and switching means for activating the phase locking control means while each said address portion is being irradiated with the light beam and for activating the frequency control means while each said data portion is being irradiated with the light beam.

9. The optical disk drive of claim 8, wherein the switching means deactivates the frequency control means in the interval during which each said address portion is being irradiated with the light beam.

10. The optical disk drive of claim 8, wherein in reading out data recorded on each said data portion, the switching means deactivates the frequency control means and activates the phase locking control means while the data portion is being irradiated with the light beam.

* * * * *